United States Patent [19]

Heck et al.

[11] Patent Number: 4,543,170

[45] Date of Patent: Sep. 24, 1985

[54] METHOD OF PRODUCING ACCURATELY SCALED, WELL-DEFINED SURFACES OF WORK PIECES FROM CARBONACEOUS CAST IRON WITH TRIBOLOGIC PROPERTIES

[75] Inventors: Klaus Heck; Horst Lindner, both of Ingolstadt, Fed. Rep. of Germany

[73] Assignee: Audi AG, Ingolstadt, Fed. Rep. of Germany

[21] Appl. No.: 490,184

[22] Filed: Apr. 29, 1983

[30] Foreign Application Priority Data

May 12, 1982 [DE] Fed. Rep. of Germany ....... 3217818

[51] Int. Cl.⁴ .............................. B23P 1/00; B23P 1/20
[52] U.S. Cl. .............................. 204/129.2; 204/129.46; 204/140
[58] Field of Search ............. 204/129.1, 129.2, 129.46, 204/140; 206/129.75

[56] References Cited

U.S. PATENT DOCUMENTS 3,945,893  3/1976  Ishimori et al. ............. 204/129.1 X
4,039,399  8/1977  Wallace et al. ............. 204/129.1 X
4,204,924  5/1980  Harifinger et al. ......... 204/129.75 X

FOREIGN PATENT DOCUMENTS 1273987  9/1961  France .............................. 204/129.1

Primary Examiner—Donald R. Valentine
Attorney, Agent, or Firm—Lalos, Leeds, Keegan, Marsh, Bentzen & Kaye

[57] ABSTRACT

The invention relates to a process for producing accurately scaled, well-defined surfaces of workpieces made from carbonaceous cast iron and having tribologic properties, more particularly of cylinders or internal combustion engines, said surfaces being subjected to at least two operating cycles consisting of an electrochemical and a subsequent mechanical removal. To obtain a constant surface quality, at least the last operating cycle is carried out in a specified ratio between the electrochemical and the mechanical removal and this is a fixed removal ratio. Preferably, a metal bearing plateau percentage of 40 to 65% of the surface is produced with the last operating cycle.

4 Claims, 2 Drawing Figures

METHOD OF PRODUCING ACCURATELY SCALED, WELL-DEFINED SURFACES OF WORK PIECES FROM CARBONACEOUS CAST IRON WITH TRIBOLOGIC PROPERTIES

BACKGROUND AND DISCUSSION OF THE INVENTION

The invention relates to a method of producing accurately scaled, well-defined surfaces of workpieces from carbonaceous cast iron and having tribologic properties, more particularly of cylinders of internal combustion engines.

A method for producing the working surfaces of cylinders of internal combustion engines is described in West German Patent Application P 31 19 847.3-14. In this method, the working surface of the cylinder is subjected to various operating cycles consisting of an electrochemical removal and a mechanical friction-cladding removal, so that a dimensionally accurate, tribologically suitable surface can be achieved. During the mechanical removal of the electrolytically treated surface, the protruding graphite is removed without causing the open graphite flakes and resulting pockets to be smeared shut by adjacent metallic material. Moreover, surface constituents of the base material, particularly mixed crystals, are abraded and subsequently clad by rolling. This results in a surface in which bearing, flat plateaus which are partially clad with graphite, mixed crystals and/or possible electrolytic residues, alternate with open graphite flakes. Compared with previous bright surfaces, such a surface has a dark-glossy appearance.

When mass-producing such surfaces, it has proved to be problematical to make well-defined surface structures that can be reproduced as required. This is because, among other things, work materials of the workpieces to be machined differ, due to tolerances, in their chemical composition and mechanical properties, as well as to tolerances during the prefinishing.

The object of the invention is to provide a method that is particularly suitable for mass production and which ensures the production of well-defined, tribologically suitable, dimensionally accurate surfaces of constant quality.

This object is achieved in accordance with the invention with the characterizing features of claim 1. As discovered by the inventors, "by fixing a specified ratio between the electrochemical and mechanical surface removals of the last operating cycle and by including this in the total removal ratio, a constant, well-defined surface quality can be achieved."

Features of the invention result in a very favorable surface which is more particularly suited for working surfaces of cylinders of internal combustion engines with respect to the running-in and wear characteristics. A first operating cycle can already occur with constant predetermined data for the electrochemcial and mechanical stock removal, advantageous conclusions can be drawn that are essential with respect to the other operating cycles and the definitive surface quality desired. In this way, a process control can be provided which contributes significantly toward achieving a surface quality that can be produced within the shortest production time possible.

Process steps are carried out continuously during fabrication, preferably by means of a processor. The processor determines, in accordance with the actual dimensions of the workpiece, the total stock removal ratio, the particular ratio between theoretical and actual stock removal, and computes the required intermediate operating cycles, taking account of the last stock removal ratio computed.

DETAILED DESCRIPTION OF THE PREFERRED EMBODIMENT

Figure 1:
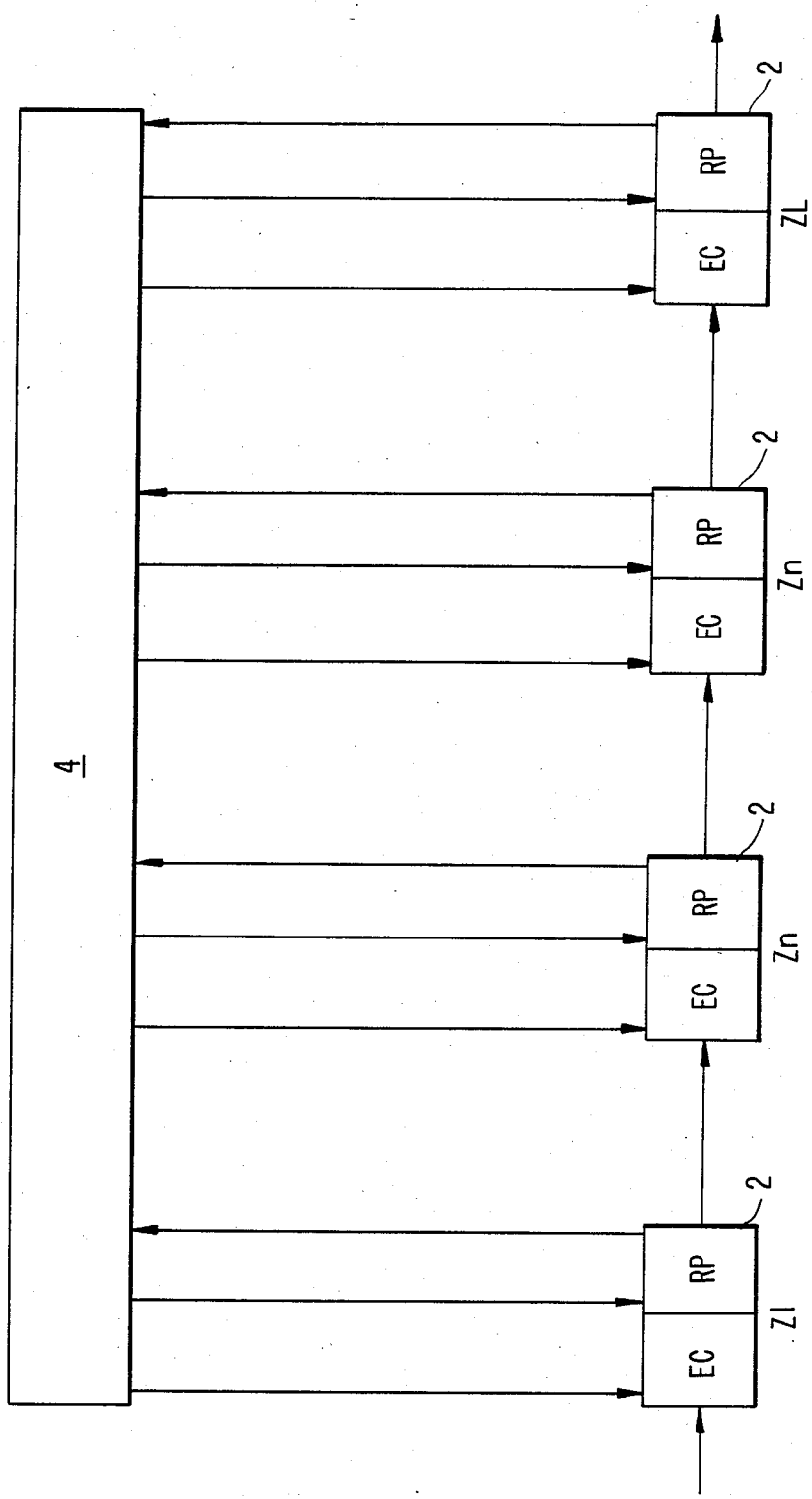
FIG. 1 is a block diagram according to the invention for the fabrication of cylinders of internal combustion engines in four operating cylces.

The block diagram shows a workpiece or cylinder housing 2 of an internal combustion engine whose cylinder is finished through electrochemical machining (EC) and mechanical or friction-cladding machining (RP). For detailed information regarding the actual electrochemical and friction-cladding machining, reference is made to West German Patent Application P 31 19 847 which also originates from the applicant.

The control of the predetermined data for the electrochemical machining, such as electric charge per $cm^2$ surface, turn-on time, etc., and for the friction-cladding machining such as contact pressure, overlapping between workpiece and tool, etc., takes place via a processor 4.

As a first step, on the cylinder housing 2 the diameter of the predrilled cylinder is, for example, determined in accordance with the ram-pressure method of measurement and is input into the processor 4. In the first phase, the processor 4 controls in the preset ratio the first operating cycle Zl or the first electrochemical and friction-cladding machining of the cylinder.

Upon completion of Zl, the cylinder diameter $\phi Zl$ is measured again and input into the processor 4. The following logic operations are performed in the processor 4:

1. Computation of the actual stock removal $\Delta \phi Zl$ in comparison with the theortetical removal in accordance with the fixed predetermined data for Zl;

2. Computation of the total removal ratio still needed for the finished size;

3. Subtraction of the stock removal ratio $\Delta \phi ZL$ fixed for the last operating cycle ZL from the total removal ratio;

4. Computation of the number of intermediate operating cycles Zn in accordance with the diameter $\phi Zl$ and of the actual stock removal ratio $\Delta \phi Zl$;

5. Computation of the stock removal ratio $\Delta \phi Zn$ for the next intermediate operating cycle Zn and, if necessary, for further intermediate work cycles Zn.

Simplified, the next stock removal ratio is computed as follows:

$$\phi Zn = \frac{(\phi ZL - \phi Zl) - \Delta \phi ZL}{\text{number of } Zn}$$

The computed predetermined data for the intermediate operating cycle Zn are again entered into the finishing stations and the second electrochemical and friction-cladding machining appropriately controlled in a fixed ratio to one another.

If the processor 4, on the basis of the input and measured data, has not computed any further intermediate operating cycle Zn, the operating cycle ZL follows after measurement of the cylinder and computation of the data φZn and actual stock removal ratio ΔφZn, if necessary, after a slight correction of the fixed predetermined data for ΔφZL.

If the processor 4 has computed a further intermediate operating cycle Zn, then, following Zn, the arithmetical operation described above can again be executed, but with Zn and ΔφZn of the preceding operating cycle Zn as a starting point.

After these computed predetermined data, the second intermediate operating cycle Zn and, if necessary, further intermediate operating cylces Zn and subsequently, as indicated hereinabove, the operating cycle ZL, are executed. After running through ZL, the cylinder is subjected to a final check measurement.

Figure 2:
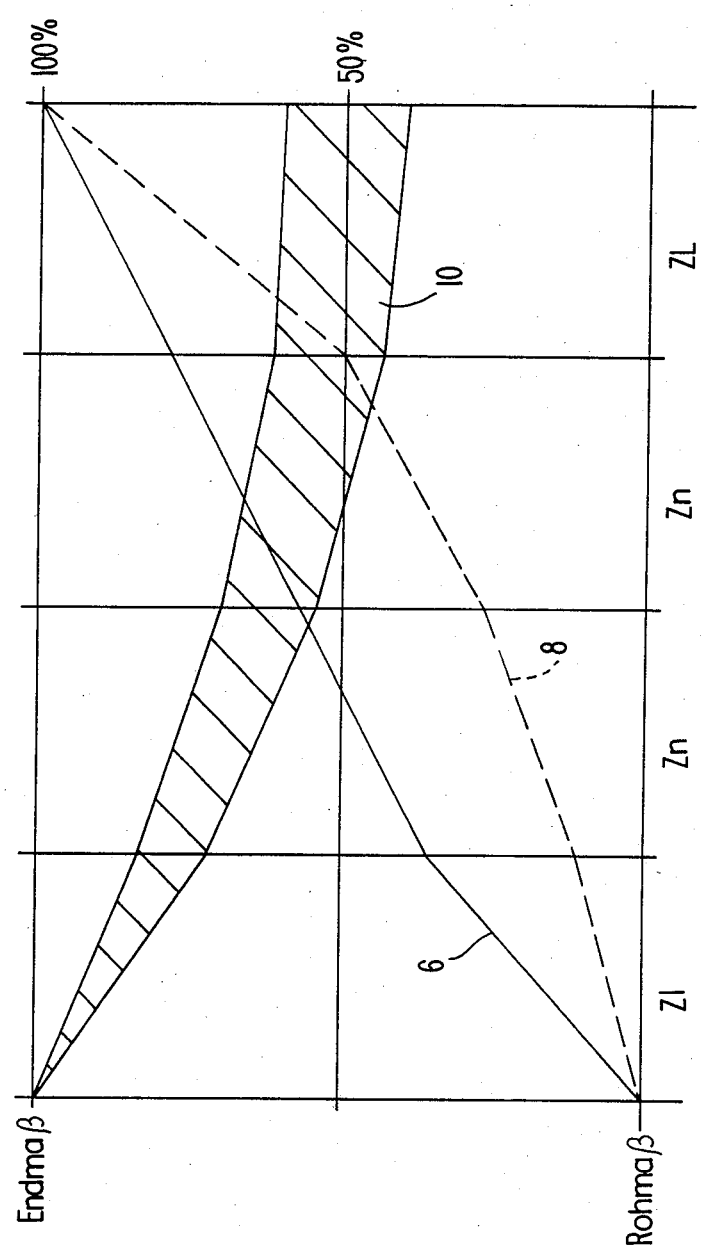
FIG. 2 is a diagram which shows the relationship between the removal and the surface structure.

With the process steps described hereinabove, it is at all times possible to reproduce, with a high degree of geometrical precision, the surface structure illustrated in the diagram of FIG. 2. In the diagram, there are plotted via the completed operating cycles Z1 to ZL, with the aid line 6, the diameter stretching or the surface removal; with the aid of dotted line 8 the portion of the open graphite flakes; and with the hatched area 10 the portion of the metallically bearing, flat plateaus expressed as a percentage. As can be seen from the diagram, the metallic surface portion, prior to carrying out Z1, is 100%, whereas the graphite flakes are nipped as a result of the purely mechanical rough-finishing (drilling).

With the aid of the process described hereinabove, it is possible to produce open graphite flakes in the surface structure and to adjust the portion of the metallically bearing plateaus to the preferred 40-65% of the structure.

We claim:

1. Method of producing accurately scaled, well-defined surfaces of workpieces made from carbonaceous cast iron and having tribologic properties, comprising subjecting said surfaces to at least two operating cycles, starting with a first cycle and concluding with a last cycle, each cycle including an electrochemical and a subsequent mechanical removal in order to create surfaces with a proportion of metallically bearing plateaus which are partially clad with graphite and mixed crystals and with open areas covered with graphite flakes and having a modest micro roughness, carrying out at least the last operating cycle in a specified ratio between electrochemical and mechanical removal to produce in the last operating cycle a metallically bearing plateau proportion of 40% to 65% of the surface.

2. The method according to claim 1 wherein, at least three operating cycles are carried out and that the first operating cycle occurs in a fixed ration between electrochemical and mechanical removal.

3. The method according to claim 1 or 2 wherein the surfaces of workpieces are cylindrical having a diameter, and the method includes the following steps:
   (a) Measuring the diameter of the surface;
   (b) Carrying out said first operating cycle;
   (c) Determining the diameter after said first cycle and the actual removal ratio of the first cycle;
   (d) Subtracting the removal ration predetermined for the last operating cycle from the remaining removal ratio;
   (e) Determining the number of intermediate operating cycles in accordance with the diameter;
   (f) Determining the removal ratio for the next intermediate operating cycle Zn and, if necessary, for further intermediate operating cycles Zn;
   (g) If necessary, repeating steps c-f after each intermediate operating cycle Zn.

4. The method according to claim 1 or 2 wherein workpiece dimensions and removal ratios after each operating cycle are fed to a processor, said processor controlling the electrochemical and mechanical machining.

* * * * *